(12) United States Patent
Herring et al.

(10) Patent No.: US 9,445,396 B1
(45) Date of Patent: Sep. 13, 2016

(54) SIGNAGE ACKNOWLEDGEMENT TIED TO PERSONAL COMPUTER DEVICE

(71) Applicant: Toshiba Global Commerce Solutions Holdings Corporation, Tokyo (JP)

(72) Inventors: Dean Frederick Herring, Youngsville, NC (US); Brad M. Johnson, Raleigh, NC (US); Jeffrey Smith, Raleigh, NC (US); Adrian Rodriguez, Durham, NC (US)

(73) Assignee: TOSHIBA GLOBAL COMMERCE SOLUTIONS HOLDINGS CORPORATION, Tokyo (JP)

( * ) Notice: Subject to any disclaimer, the term of this patent is extended or adjusted under 35 U.S.C. 154(b) by 0 days.

(21) Appl. No.: 14/657,318

(22) Filed: Mar. 13, 2015

(51) Int. Cl.
H04M 3/493 (2006.01)
H04W 68/04 (2009.01)
H04W 4/02 (2009.01)
H04W 60/04 (2009.01)

(52) U.S. Cl.
CPC ............. *H04W 68/04* (2013.01); *H04W 4/021* (2013.01); *H04W 60/04* (2013.01)

(58) Field of Classification Search
CPC ..... H04W 4/02; H04W 88/06; H04W 8/005; H04W 12/00; H04W 4/008; H04W 12/06; H04W 76/02; H04W 52/0209; H04L 67/306; H04L 65/1069
USPC ....................................... 455/414.2
See application file for complete search history.

(56) References Cited

U.S. PATENT DOCUMENTS

| | | | |
|---|---|---|---|
| 7,319,395 B2 | 1/2008 | Puzio et al. | |
| 7,801,514 B2 * | 9/2010 | Lauper ................. | H04M 17/00 455/417 |
| 7,898,407 B2 | 3/2011 | Hufton et al. | |
| 8,400,310 B2 | 3/2013 | Brow | |
| 8,544,033 B1 | 9/2013 | Acharya et al. | |
| 8,593,255 B2 | 11/2013 | Pang et al. | |
| 2004/0156487 A1 * | 8/2004 | Ushiki ................... | H04L 67/18 379/88.22 |
| 2004/0266460 A1 | 12/2004 | Reynolds | |

(Continued)

FOREIGN PATENT DOCUMENTS

| | | |
|---|---|---|
| WO | 2009074791 A1 | 6/2009 |
| WO | 2012001704 A1 | 1/2012 |
| WO | 2013084225 A1 | 6/2013 |

OTHER PUBLICATIONS

Cavallini, (Gaia-Matrix) "iBeacons Bible 1.0" Retrieved from the Internet: URL https://meetingofideas.files.wordpress.com/2013/12/ibeacons-bible-1-0.pdf [retrieved on Feb. 6, 2015]; 2014, pp. 1-15.

*Primary Examiner* — Don N Vo
(74) *Attorney, Agent, or Firm* — Coats & Bennett, PLLC

(57) ABSTRACT

A user is enabled to use a mobile device to electronically acknowledge information relating to a sign encountered by the user within the user's environment. The mobile device detects a signal transmitted by an electronic source placed on or near the sign and register with a remote server. The registration may include an identifier of the electronic source and an identifier of the mobile device. In response to the registration, the mobile device receives content associated with the electronic source, and displays that content in a notification on a display of the mobile device. The user may then acknowledge the notification via a prompt on the display. The mobile device receives input from the user acknowledging the notification, and sends an acknowledgement message to the remote server.

17 Claims, 8 Drawing Sheets

(56) References Cited

U.S. PATENT DOCUMENTS

| | | | |
|---|---|---|---|
| 2005/0021773 A1* | 1/2005 | Shiga | G06Q 30/02 709/228 |
| 2007/0203796 A1 | 8/2007 | Riggs | |
| 2007/0252891 A1 | 11/2007 | Gurley | |
| 2010/0223114 A1 | 9/2010 | Yao et al. | |
| 2011/0169634 A1 | 7/2011 | Raj et al. | |
| 2012/0171952 A1* | 7/2012 | Ohira | H04M 1/72525 455/41.1 |
| 2013/0191149 A1 | 7/2013 | Kolberg et al. | |
| 2013/0214903 A1 | 8/2013 | Kalous et al. | |
| 2014/0139356 A1 | 5/2014 | Vaquin et al. | |

* cited by examiner

SIGNAGE ACKNOWLEDGEMENT TIED TO PERSONAL COMPUTER DEVICE

TECHNICAL FIELD

The present disclosure generally relates to electronic acknowledgment of information encountered in a user's environment, and more particularly to methods for tracking whether a user acknowledges the content of a posted sign.

BACKGROUND

Signs posted within an environment play an important role in notifying onlookers of important information. Many signs merely serve to enhance the convenience of the public. For example, street signs are often used to inform pedestrians of their current location. However, other signs serve important public safety or regulatory functions. For example, some signs inform drivers of when it is legal to park their vehicle in a particular place. Other signs remind employees that they must wash their hands before returning to work after using the bathroom. Yet other signs warn people that wearing a hard hat is required to enter a construction site.

Although signs such as these play a significant role in informing and protecting the public, many signs consist of nothing more than a written warning, perhaps accompanied with some colored and/or flashing lights to get a passerby's attention. Getting people to notice these signs, read them, understand them, and comply with them can be a significant problem, particularly when such signs are used to warn the public of potentially life-threatening hazards nearby (e.g., high-voltage wires, minefields, heavy machinery, quarantine areas).

DETAILED DESCRIPTION

Figure 1:
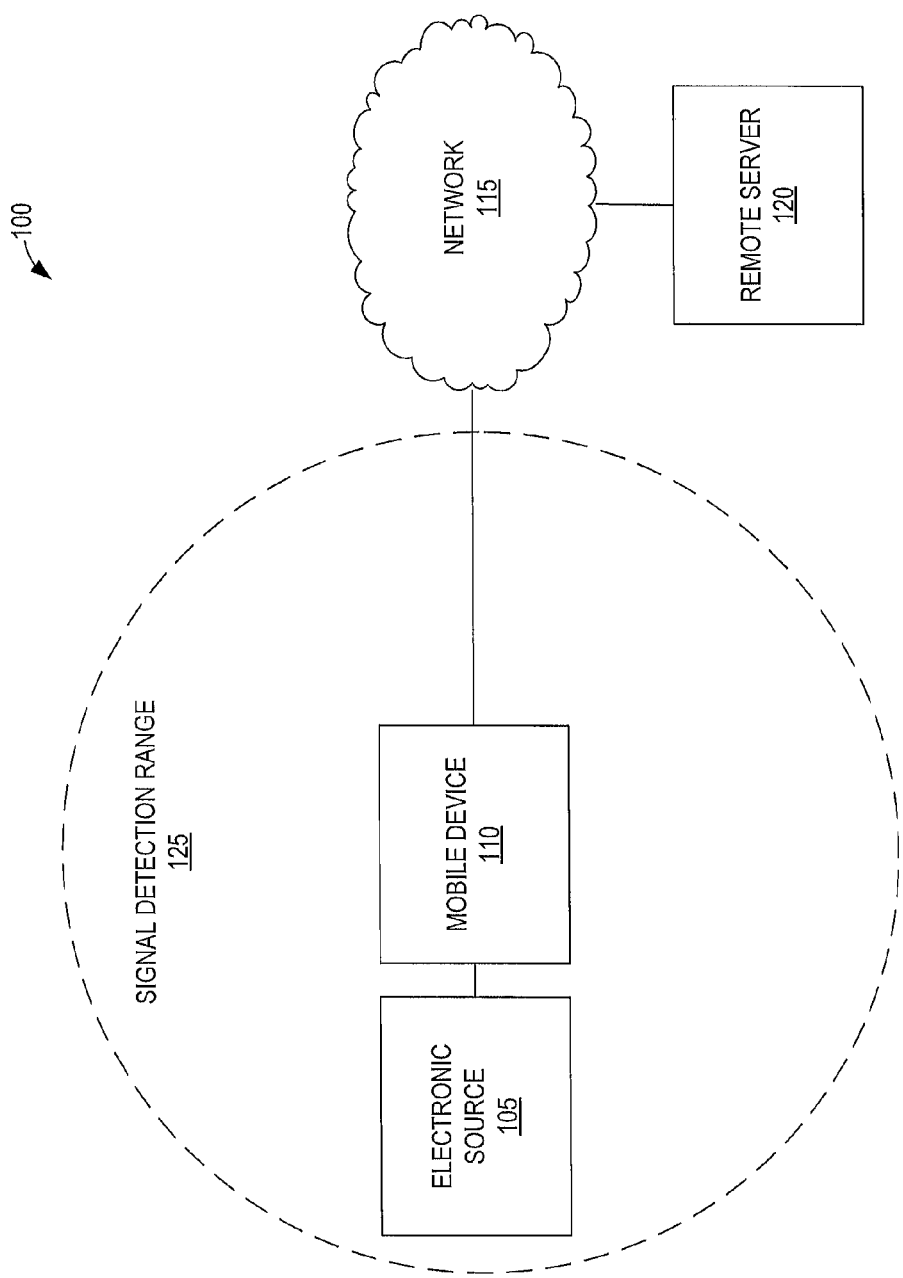
FIG. 1 is a logical block diagram that illustrates a system for acknowledging a posted sign, according to embodiments of the present disclosure.

FIG. 1 illustrates an example system 100 for acknowledging signs using a mobile device 110, such as a cellular phone, tablet, laptop computer, personal data assistant, or personal music player. The system includes the mobile device 110, an electronic source 105, a network 115, and a remote server 120. The mobile device 110 is able to detect the electronic source 105 once the electronic source is within a signal detection range 125. According to embodiments, the electronic source 105 may be, for example, an RFID tag, Wi-Fi access point, near field communications (NFC) terminal, active radio beacon, or a BLUETOOTH transmitter. The signal detection range 125 is a physical distance within which circuitry within the mobile device 110 is able to detect signals originating from the electronic source 105. The outer limits of signal detection range 125 may depend on a number of factors, including the sensitivity of radio circuitry within the mobile device 110, the strength of the signal emanating from electrical source 105, and interference that may be present in the environment, among other factors. In order for the mobile device 110 to detect the electronic source 105 when the signal detection range 125 is small, the mobile device 110 and electronic source 105 will generally need to be physically closer together than when the signal detection range 125 is large. Thus, the signal detection range 125 may be used to control a relevant physical boundary around which embodiments of the present disclosure are practiced, at least to some degree.

The mobile device 110 is also able to communicate with a network 115, such as the Internet, a cellular network, or Local Area Network (LAN), over a wireless connection. The network 115 may be used to exchange messages with the remote server 120. Accordingly, the network server 120 may be used, for example, to receive registration messages from the mobile device 110 in order to track when the user encounters the electronic source 105, send content associated with the electronic source 105 to the mobile device 110, and receive and store acknowledgement messages, relating to that content, from the mobile device 110.

Figure 2:
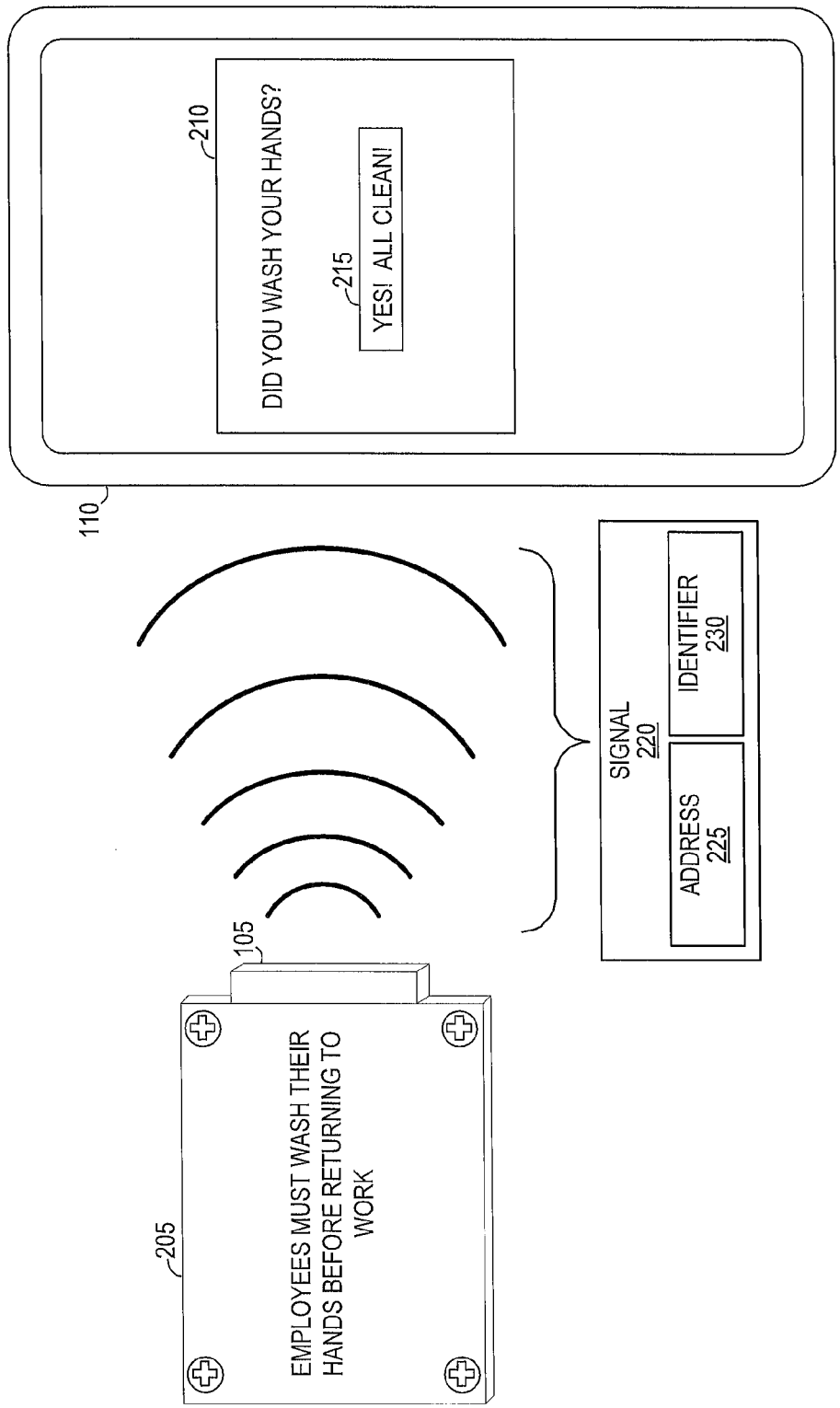
FIG. 2 illustrates a mobile device receiving a signal from an electronic source associated with a posted sign, according to embodiments of the present disclosure.

The electronic source 105 may be positioned on or near a sign 205, as depicted in FIG. 2. The electronic source radiates a radio signal 220 that can be detected by the mobile device 110. The signal 220 comprises an identifier 230 that identifies the electronic source 105 (e.g., a serial number, a Universally Unique Identifier (UUID)), and an address 225 of the remote server 120 (e.g., an Internet Protocol (IP) address). According to embodiments, the identifier 230 and the address 225 may be the same (e.g., a Media Access Control (MAC) address, a Uniform Resource Identifier (URI)). The mobile device 110 uses the signal 220 to display an appropriate notification 210 that corresponds to the sign 205 using content obtained from the remote server 120 (not shown in FIG. 2). The mobile device 110 also presents a prompt 215 to the user that can be used to acknowledge the notification 210. The prompt 215 may be, for example, a graphical button that the user can tap or click on to indicate their acknowledgement. The prompt 215 can also be a more complex user interface element that requires the user's input, such as a text input field that requires the user to type certain words (e.g., "I agree," "I accept," "I acknowledge").

The sign 205 depicted in FIG. 2 is a reminder for employees to wash their hands before returning to work. Such a sign 205 may commonly be found fastened to the wall of a restaurant bathroom in a highly visible location. When the electronic source 105 is associated with such a sign 205, it may be appropriate for the mobile device 110 to display a notification 210 asking the user whether they did, in fact, wash their hands. Although sign 205 and electronic source 105 are depicted as stationary, according to embodiments, the sign 205 and/or electronic source 105 may be movable, or even portable. For example, sign 205 may be a warning printed on a portable power tool indicating that safety goggles are required to use the tool. In such case, the electronic source 105 may be affixed to the power tool itself, or may be installed within a toolbox or workbench where the power tool is stored, for example. In addition, the notification 210 displayed by the mobile device 110 may ask the user to certify that they are, in fact, wearing their safety googles, and/or may ask the user to accept the risk of physical injury that comes with using the power tool. Thus, various embodiments of system 100 may be useful to obtain acknowledgements from users in a wide variety of scenarios.

Figure 3:
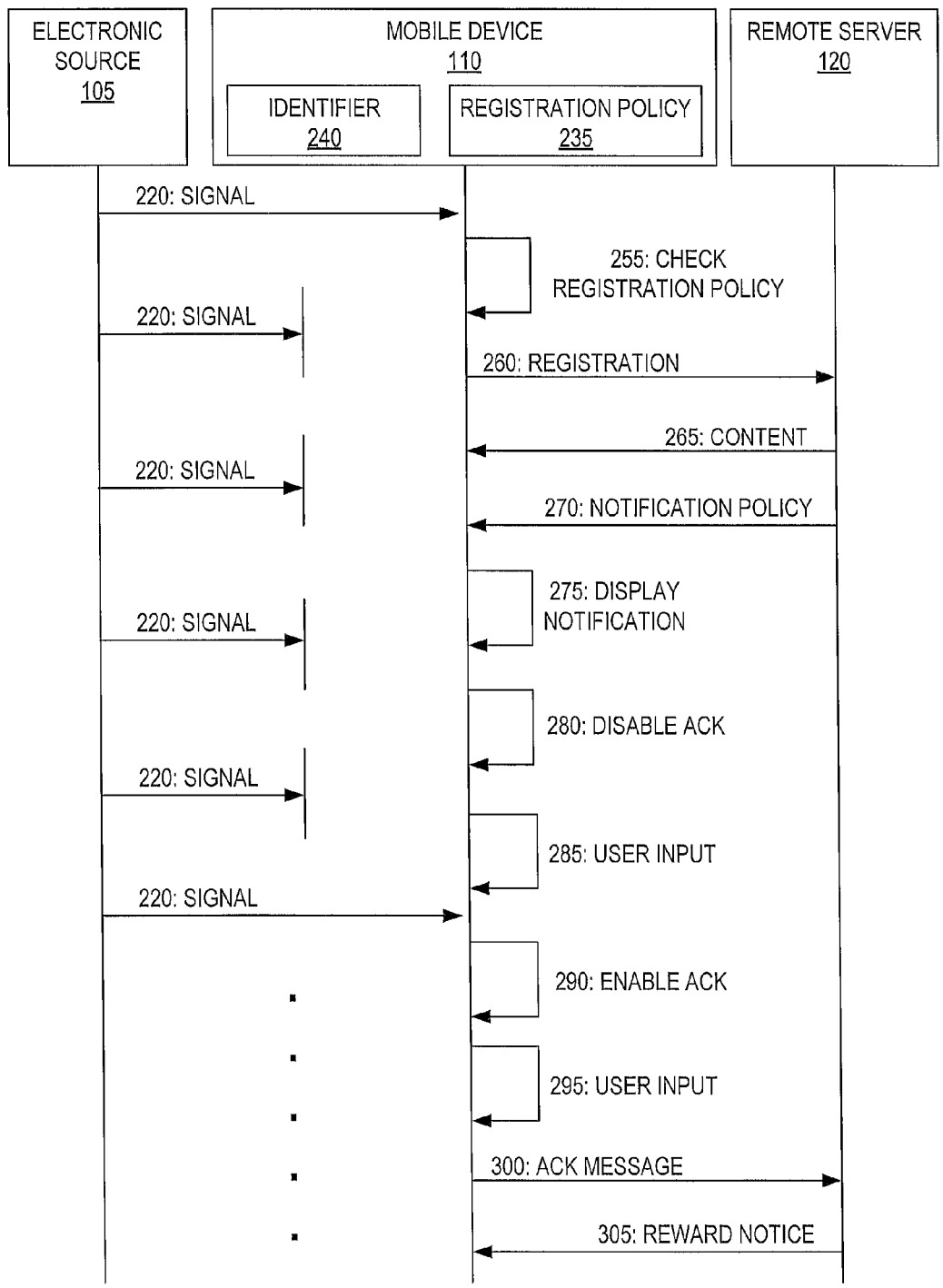
FIG. 3 is a signal diagram that illustrates signaling between an electronic source, mobile device, and remote server, according to embodiments of the present disclosure.

FIG. 3 illustrates an example of the signaling exchanged between the electronic source 105, mobile device 110, and remote server 120, according to embodiments of the present disclosure. According to embodiments, the signal 220 is transmitted by the electronic source 105 in response to an earlier signal sent by the mobile device 110 (not shown in FIG. 3). A passive RFID tag, for example, lacks its own power source. Thus, when used to implement electronic source 105, the passive RFID tag may use energy radiated from the mobile device 110 to induce a current within the passive RFID tag's antenna to transmit the signal 220. According to other embodiments, the electronic source 105 has a source of power (e.g., a battery, a wall outlet) and sends the signal 220 periodically, at fixed or at varying intervals.

The mobile device 110, having detected the signal 220, sends a registration 260 to the remote server 120. This registration 260 may include, for example, the identifier 230 of the electronic source 105 (as obtained from the signal 220) and an identifier 240 of the mobile device 110 (e.g., a phone number, an email address). Such registration 260 may, for example, serve to notify the remote server 120 that a particular user of the mobile device 110 is in proximity to the sign 205 associated with the electronic source 105. According to embodiments, mobile device 110 may have a registration policy 235 that governs whether or not the mobile device 110 registers when signal 220 is detected. Thus, sending the registration 260 may be based, according to embodiments, on a comparison 255 between information in the signal 220 and the registration policy 235. For example, the registration policy may indicate that the mobile device 110 is to send the registration 260 for signals 220 comprising a particular identifier 230, or for signals 220 comprising an address 225 of a particular remote server 120. The registration policy 235 may also indicate that the mobile device 110 is to send the registration 260 only during certain times, or when the mobile device 110 is in a certain state. Thus, the registration policy 235 may be used to include or exclude certain electronic sources 105 or mobile devices 110 from participating in the system 100 at given times or under certain conditions.

For example, sign 205, as illustrated in FIG. 2, reminds restaurant employees that they must wash their hands before returning to work. This sign 205 is directed only at employees, and not, for example, customers. Such a sign 205 may be present in both the men's and women's bathroom of the restaurant, and each may have a respective electronic source 105, each of which transmits a respective signal 220 that comprises a respective identifier 230 of the corresponding electronic source 105. Employees of the restaurant may have a registration policy 235 on their respective mobile devices 110 indicating that the mobile devices 110 are to send the registration 260 when a signal 220 comprising the identifier 230 of the electronic source 105 in either bathroom is detected. Each signal may also, or instead, comprise an address 225 to the same remote server 120, which may be at a known IP address 225 on a local network 115. In such case, the registration policy 235 may indicate that the mobile devices 110 are to send the registration 260 when a signal 220 comprising the known IP address 225 of the network server 120 is detected. Accordingly, non-employees may refrain from sending the registration 260, as they would typically lack a registration policy 235 configured as described above. More generally, the registration policy 235 may be present on the mobile devices 110 of users over whom an administrator of the electronic source 105 has some measure of control. For example, a business owner may use the system 100 to track employees, parents may use the system 100 to track children, teachers may use the system 100 to track students, and doctors may use the system 100 to track nurses and/or patients.

Returning to FIG. 3, after the mobile device 110 sends the registration 260 to the remote server 120, the mobile device 110 receives content 265 associated with the electronic source 105 in response. The mobile device 110 displays 275 a notification 210 comprising this content 265 and a prompt 215 through which the user may provide input 295 to acknowledge the notification 210. For example, when the electronic source 105 is associated with the hand-washing sign 205 of FIG. 2, the content 265 may be a question asking the user of mobile device 110 to certify that they have, in fact, washed their hands. When the electronic source 105 is associated with a warning sign 205 indicating that hard hats are required in a particular construction zone, the content 265 may be a reminder that failure to comply with jobsite safety requirements is punishable by immediate termination. When the electronic source 105 is associated with a fire evacuation map in a hotel room, the content may be an animated gif or video illustrating the path from the room to the nearest exit. The content 265 may be configured by an administrator of the system 100, and may vary widely depending on the particular use case to which the system 100 is applied. After the user provides input 295 to acknowledge the notification 210, the mobile device 110 may send an acknowledgement message 300 to the remote server 120. In this way, the remote server 120 may not only track which users have come in contact with the sign 205, but also track which users have actually read, understood, indicated their compliance with, or otherwise acknowledged content provided by the remote server 120 concerning the sign 205.

According to embodiments, the mobile device 110 may also receive a notification policy 270 from the remote server 120. The notification policy 270 may define at least one behavior for the mobile device 110 when displaying 275 the notification 210. For example, the notification policy 270 may require the content 265 to be displayed 275 in the notification 210 for at least a minimum duration before the user may use the prompt 215 to acknowledge the notification 210. Alternatively or additionally, the notification policy 270 may require that the user acknowledge the notification 210 within a maximum duration, at a particular location, and/or may dictate that the phone vibrate when the notification 210 is displayed, according to embodiments. Thus, receiving the notification policy 270 from the remote server 120 enables the mobile device 110 to display 275 the notification 210 in accordance with that notification policy 270. According to other embodiments, this notification policy 270 is not received from the remote server 120, at least in part, but is instead preconfigured, at least partly, at the mobile device 110.

There are a variety of scenarios in which it is important that the user acknowledge the notification 210 while they are still physically close to the electronic source 105. For example, a user's acknowledgement that they understand a particular sign 205 may be at least slightly more reliable if the user is required to stand in close proximity to the sign 205 in order for the system 100 to accept the acknowledgment. Thus, requiring that the user be physically close to the electronic source 105 in order to successfully acknowledge the notification may help to prevent users from merely "clicking through" the notification 210 (i.e., acknowledging the notification 210 without actually reading or understanding it). Thus, according to embodiments, the mobile device 110 may disable 280 sending the acknowledgement message 300 to the network server 120 in response to failing to detect that the electronic source 105 is in the signal detection range 125 (e.g., by deactivating or removing the prompt 215). Similarly, the mobile device may enable 290 sending the acknowledgement message 300 in response to detecting that the electronic source 105 is in the signal detection range 125.

For example, FIG. 3 depicts an electronic source 105 that sends the signal 220 periodically. After receiving the first signal 220, mobile device 110 fails to receive the next four transmissions of the signal 220 (e.g., the mobile device moves such that the electronic source 105 is no longer in signal detection range 125). The mobile device 110, having sent the registration 260, received content 265 from the remote server 120 in response, and having failed to detect the electronic source 105 for some duration, disables 280 sending the acknowledgement message 300. Thus, the user input 285 does not result in any acknowledgement message 300 to be sent to the remote server 120 (i.e., the user input 285 is received while sending the acknowledgement 300 is disabled 280). It is not until after the mobile device 110 receives the sixth signal 220 transmission from the electronic source 105 that the mobile device 110 enables 290 sending the acknowledgement message 300 (e.g., the mobile device 110 may return to, or near to, where the first signal 220 was received, such that the electronic source 105 is once again in signal detection range 125). User input 295, being received after sending the acknowledgement 300 has been enabled 290, results in the mobile device 110 sending the acknowledgement message 300 to the remote server 120. In this way, the user may be required to return to physical proximity with the electronic source 105 in order for the mobile device 110 to send the acknowledgement message 300.

According to embodiments, the mobile device 110 receives a reward notice 305 in response to sending the acknowledgement message 300. Thus, the user may be enticed to acknowledge the notification 210, even if doing so would involve the inconvenience of returning to a location where the signal 220 can be detected. One example of enticing the user to acknowledge the notification 210 may involve an electronics store that has a sign 205 in the window advertising a special price on laptop computers for customers who have an electronic coupon. When the user approaches the sign 205, their mobile device 110 may detect a signal 220 sent by an electronic source 105 on or near the sign 205. The mobile device 110 may then send a registration 260 to the remote server 120 at the address 225 indicated in the signal 220 and receive content 265 in response that asks the user if they would like to receive the electronic coupon. The mobile device 110 displays 275 this content 265 to the user, and the user may then provide input 295 acknowledging that they would like to receive the coupon. The mobile device 110 sends an acknowledgement message 300 to the remote server 120, and the remote server 120 responds with the reward notice 305, which comprises the electronic coupon for the laptop.

Figure 4:
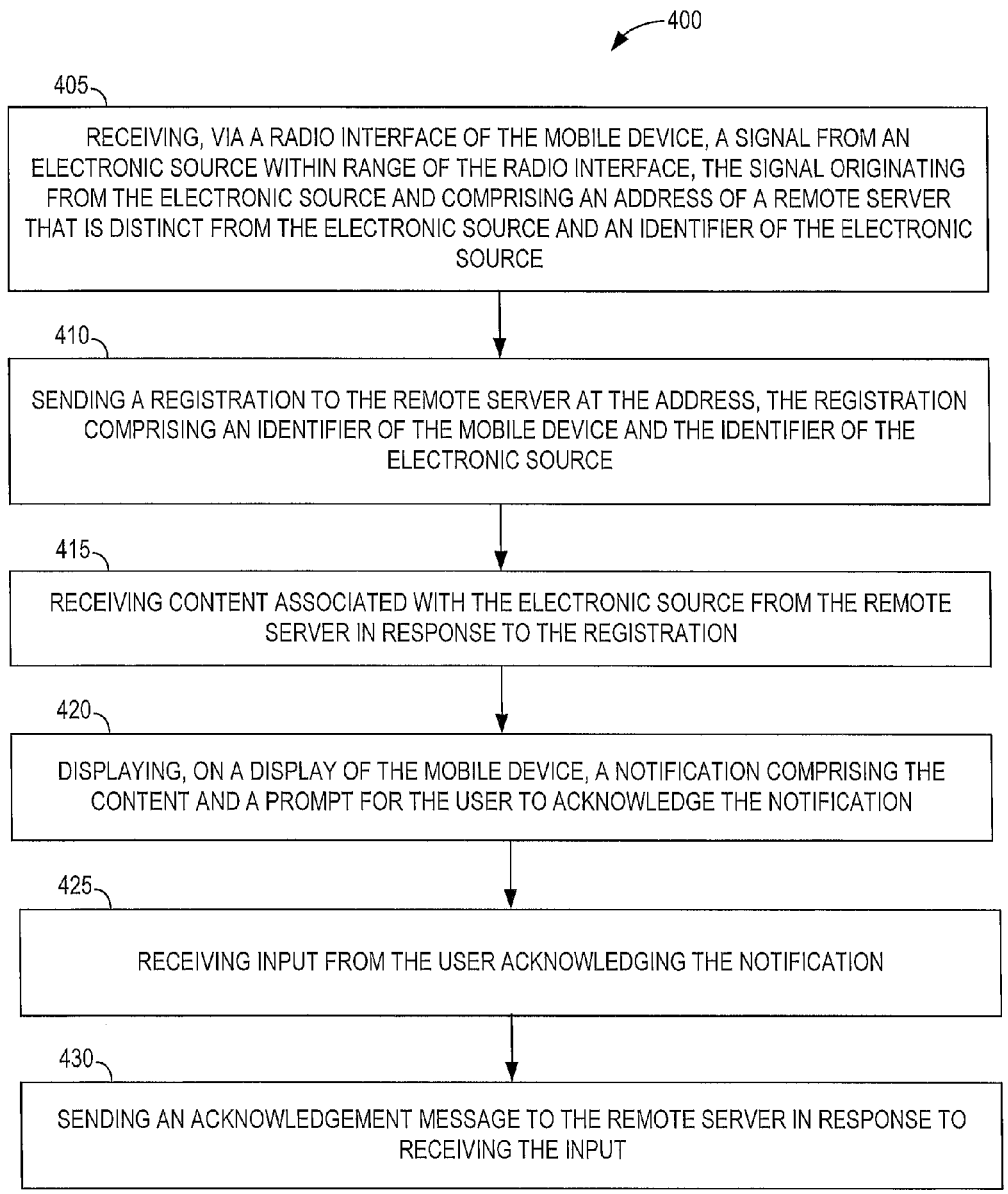
FIG. 4 illustrates a method for acknowledging a posted sign, according to embodiments of the present disclosure.

FIG. 4 illustrates a method 400, implemented in a mobile device 110, according to embodiments of the present disclosure. The method 400 comprises receiving, via a radio interface of the mobile device 110, a signal 220 from an electronic source 105 within range 125 of the radio interface, the signal 220 originating from the electronic source 105 and comprising an address 225 of a remote server 120 that is distinct from the electronic source 105, and an identifier 230 of the electronic source 105 (block 405). The method further comprises sending a registration 260 to the remote server 120 at the address 225, the registration 260 comprising an identifier 240 of the mobile device 110 and the identifier 230 of the electronic source 105 (block 410). The method further comprises receiving content 265 associated with the electronic source 105 from the remote server 120 in response to the registration 260 (block 415), and displaying 275, on a display of the mobile device 110, a notification 210 comprising the content 265 and a prompt 215 for the user to acknowledge the notification 210 (block 420). The method further comprises receiving input 295 from the user acknowledging the notification 210 (block 425) and sending an acknowledgement message 300 to the remote server 120 in response to receiving the input 295 (block 430).

Figure 5:
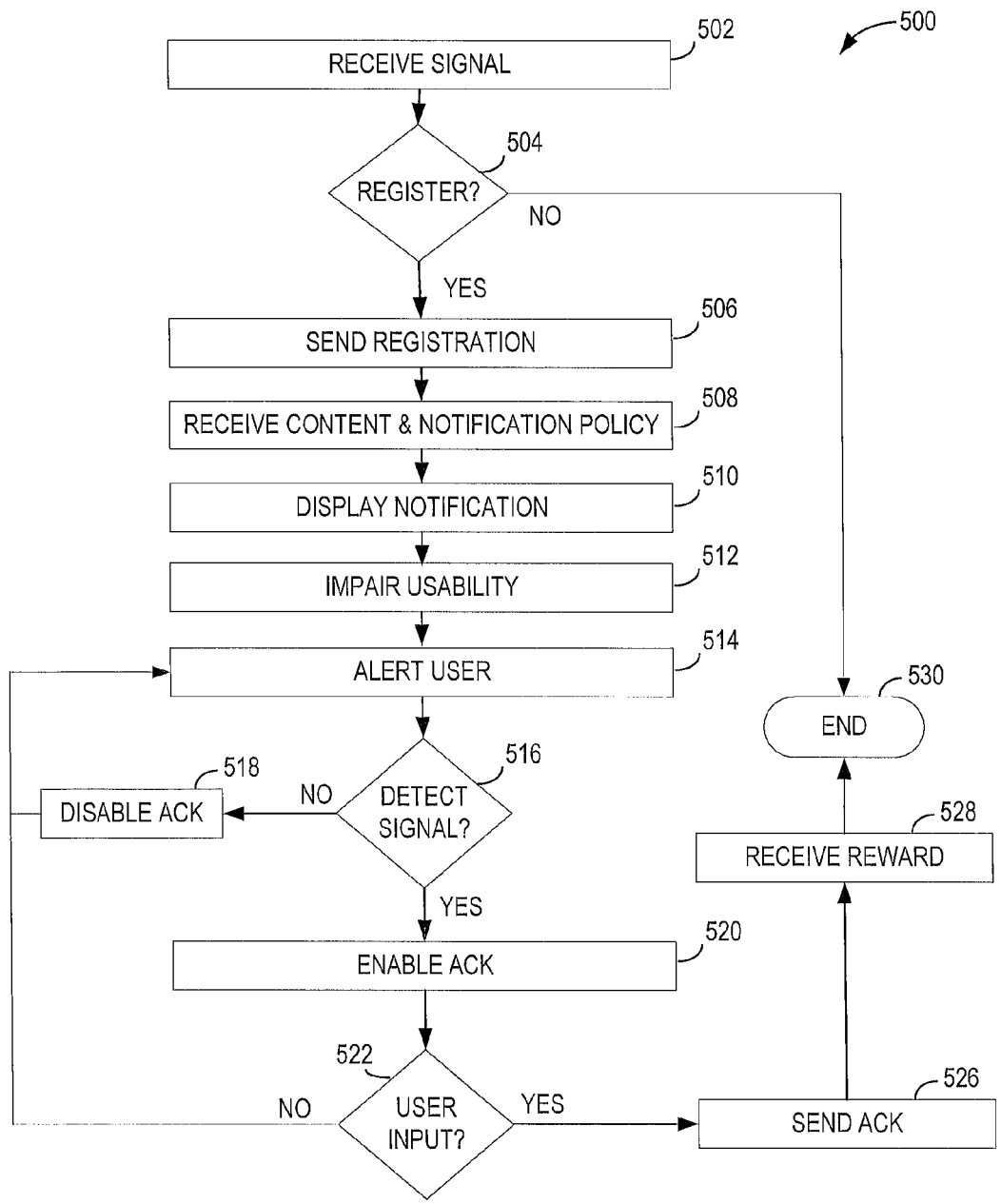
FIG. 5 illustrates a more detailed method for acknowledging a posted sign, according to embodiments of the present disclosure.

A more detailed method 500 is illustrated in FIG. 5. According to the method 500, the mobile device 110 receives the signal 220 from the electronic source 105 as previously described (step 502). The mobile device 110 then decides whether or not to register with the remote server 120 (e.g., based on a registration policy 235 as previously described) (step 504). If the mobile device 110 decides not to register, the method 500 ends (step 530). If the mobile device 110 decides to register, the mobile device 110 sends the registration 260 (step 506). In response to the registration 260, the mobile device receives content 265 associated with the electronic source 105 and a notification policy 270 (step 508). The mobile device 110 displays a notification comprising the content 265 and a prompt 215 through which the user may acknowledge the notification 210 in accordance with the notification policy 270 (step 510).

According to the method 500, the notification policy 270 indicates that the usability of the mobile device 110 is to be impaired until input 295 from the user acknowledging the notification 210 is received. Accordingly, the mobile device 110 impairs the usability of the mobile device 110 according to the notification policy 270 (step 512). For example, the mobile device 110 may prevent the user from launching particular software, may prevent communication with certain other devices on the network 115, may partially or fully obscure visual elements in the mobile device's 110 display, may vibrate continuously or periodically, and/or may be block the output of audio, until the user successfully acknowledges the notification 210.

According to the method 500, the notification policy 270 also indicates that the user be alerted until the input 295 from the user acknowledging the notification 210 is received. Further, the notification policy 270 indicates that the user is to be alerted if the mobile device 110 fails to detect that the electronic source 105 is in range 125. Accordingly, the mobile device 110 alerts the user according to the notification policy 270 (step 514). According to embodiments, such alerting may include outputting audio (e.g., alarms, audible messages, ringtones) and vibrating the mobile device 110. Further, such alerting may be, according to embodiments, periodic, continuous, or in response detecting certain events (e.g., failing to detect the signal 220 within a particular duration, failing to acknowledge the notification within a particular duration, detecting that the user is attempting to circumvent the notification 210).

The mobile device 110 then attempts to detect the signal 220 from the electronic source 105 (step 516). If the mobile device 110 fails to detect the signal 220, the mobile device 110 disables 280 sending the acknowledgement 300 (step 518) and alert the user again (step 514). Thus, the user is not able to provide input 295 to acknowledge the notification 210 so long as the signal 220 is not detected, according to the method 500. However, if the mobile device 110 detects the signal 220, the mobile device 110 enables 290 sending the acknowledgement 300 (step 520) and check whether user input 295 acknowledging the notification 210 has been received (step 522). If user input 295 acknowledging the notification 210 is not received while sending the acknowledgment message 300 is enabled and after some duration, the mobile device 110 alerts the user again (step 514). However, if the mobile device 110 receives user input 295 acknowledging the notification 210 while sending the acknowledgment message 300 is enabled, the mobile device sends the acknowledgement 300 (step 526) and receives a reward notice 305 from the remote server 120 in response (step 528). The method 500 then ends (step 530).

Figure 6:
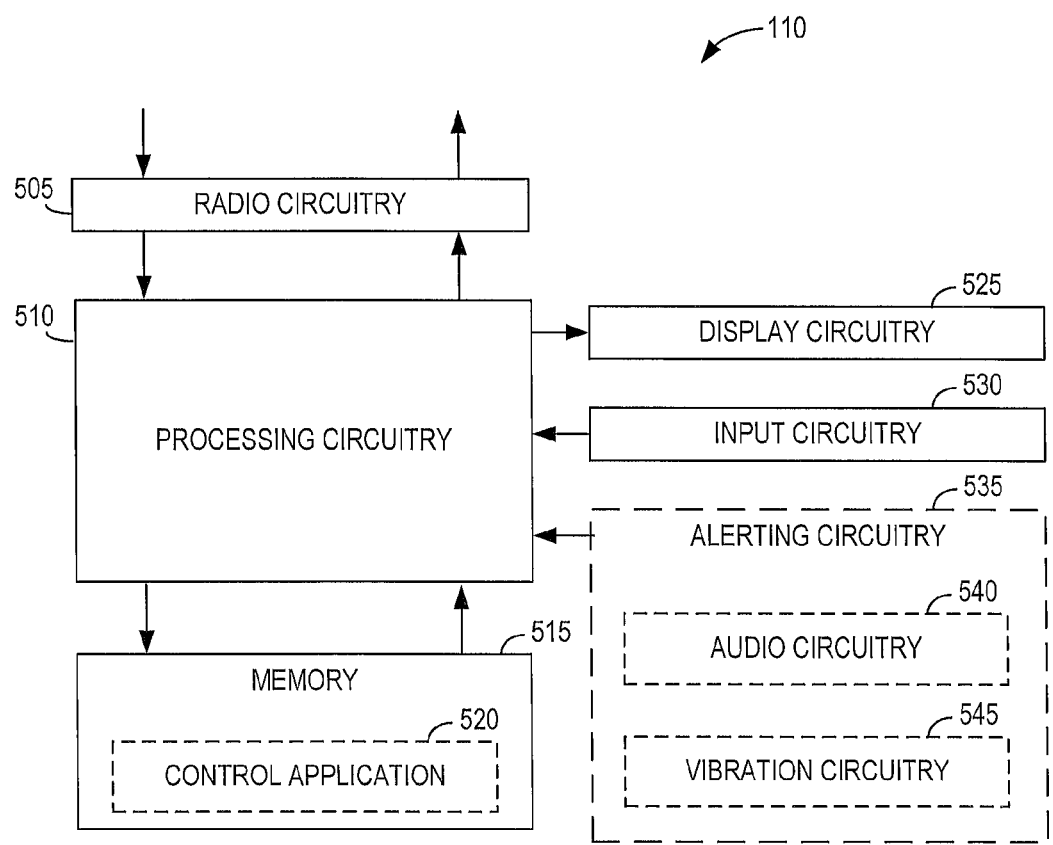
FIG. 6 is a logical block diagram that illustrates the physical circuitry of a mobile device configured according to embodiments of the present disclosure.

FIG. 6 illustrates exemplary hardware of the mobile device 110 according to embodiments. The mobile device 110 comprises processing circuitry 510 that is communicatively coupled to radio circuitry 505, a memory 515, display circuitry 525, input circuitry 530, and optionally alerting circuitry 535, via one or more buses. The processing circuitry 510 may comprise any sequential state machine capable of executing machine instructions stored as a machine-readable computer program 520 in the memory 515, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above. According to embodiments, the processing circuitry 510 is communicatively coupled to memory 515 via one or more buses. The memory 515 of the various embodiments may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

The radio circuitry 505 is configured to receive a radio signal from an electronic source 105 (e.g., via NFC, BLUETOOTH, RFID) and exchange data with a remote server 120 that is distinct from the electronic source 105 via a communications network 115 (e.g., via Wi-Fi, Long-Term Evolution (LTE)). According to various embodiments, the radio circuitry 505 may comprise analog and/or digital transceiving circuitry capable of communicating with each other, or with other devices, according to one or more communication protocols known in the art or that may be developed, such as HTTP, RTP, RTCP, HTTPs, Ethernet, TCP/IP, ATM, or the like. The radio circuitry 505 implements receiver and transmitter functionality appropriate to the communication network 115 to which it is attached (e.g., Wi-Fi, LTE) and appropriate for receiving a signal from the electronic source 105 (e.g., NFC, BLUETOOTH, RFID). The transmitter and receiver functionality may share circuit components and/or software, or alternatively may be implemented separately within the radio interface circuitry.

The input circuitry 530 is configured to accept input signals from a user of the mobile device 110. For example, the input circuitry 530 may be comprised within one or more of a pointing device (such as a mouse, stylus, touchpad, trackball, pointing stick, joystick), a touchscreen, an accelerometer, a microphone for speech input, an optical sensor for optical recognition of gestures, and a keypad or keyboard. The radio circuitry 505 may also serve as the input circuitry 530, according to embodiments, for accepting input signals from a remote user or other entity within the network 115.

The display circuitry 525 is configured to present visual information to a user of the mobile device 110. For example, the display circuitry 525 may be comprised within one or more of a graphics adapter, a graphical processing unit, a display port, a Liquid Crystal display, and a Light Emitting Diode display.

The alerting circuitry 535 comprises one or more of audio circuitry 540 configured to output audio and vibration circuitry 545 configured to vibrate the device, according to embodiments.

The processing circuitry 510 is configured to receive the signal 220 from the electronic source 105 within range 125 of, and via, the radio circuitry 505, the signal 220 originating from the electronic source 105 and comprising an address 225 of the remote server 120 and an identifier 230 of the electronic source 105. The processing circuitry 510 is further configured to send a registration 260 to the remote server 120 at the address 225 via the radio circuitry 505, the registration 260 comprising an identifier 240 of the mobile device 110 and the identifier 230 of the electronic source 105. The processing circuitry 510 is further configured to receive content 265 associated with the electronic source 105 from the remote server 120 in response to the registration 260 via the radio circuitry 505, and display 275, via the display circuitry 525, a notification 210 comprising the content 265 and a prompt 215 for the user to acknowledge the notification 210 via the input circuitry 530. The processing circuitry 510 is further configured to receive input 295, via the input circuitry 530, from the user acknowledging the notification 210 and send an acknowledgement message 300 to the remote server 120, via the radio circuitry 505, in response to receiving the input 295 via the input circuitry 530.

Figure 7:
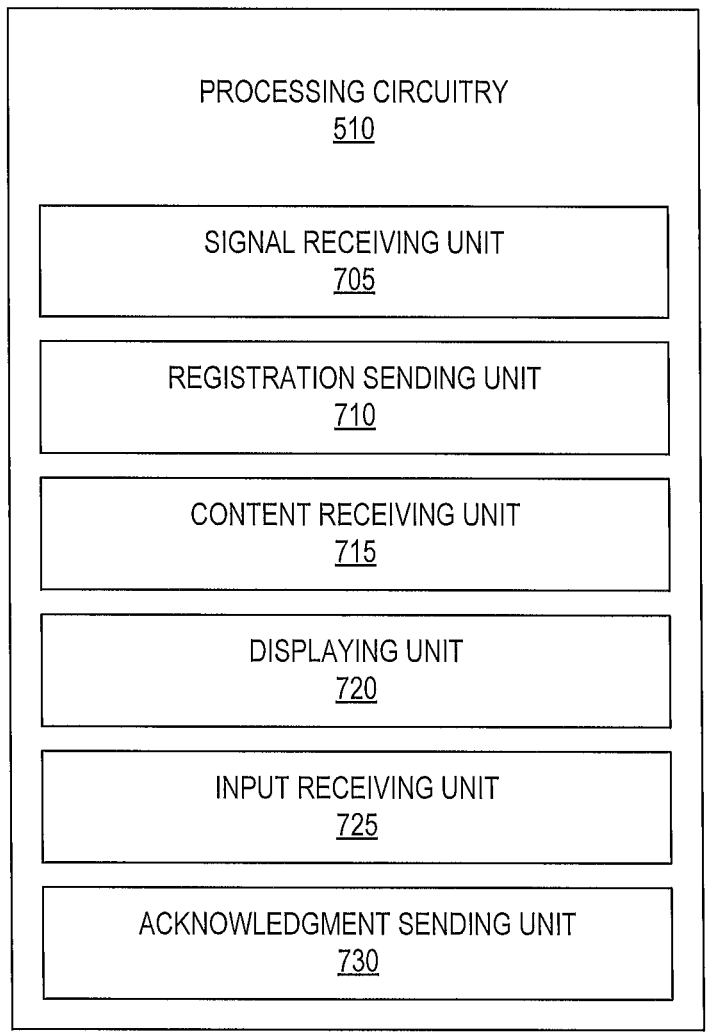
FIG. 7 is a logical block diagram that illustrates physical units within the processing circuitry of a mobile device that are configured according to embodiments of the present disclosure.

FIG. 7 illustrates an embodiment of the processing circuitry 510 comprising physical hardware units. The processing circuitry 510 comprises a signal receiving unit 705, a registration sending unit 710, a content receiving unit 715, a displaying unit 720, an input receiving unit 725, and an acknowledgement receiving unit 730.

The signal receiving unit 705 is configured to receive, via a radio interface of the mobile device 110, a signal 220 from an electronic source 105 within range 125 of the radio interface, the signal 220 originating from the electronic source 105 and comprising an address 225 of a remote server 120 that is distinct from the electronic source 105, and an identifier 230 of the electronic source 105. The registration sending unit 710 is configured to send a registration 260 to the remote server 120 at the address 225, the registration 260 comprising an identifier 240 of the mobile device 110 and the identifier 230 of the electronic source 105. The content receiving unit 715 is configured to receive content 265 associated with the electronic source 105 from the remote server 120 in response to the registration 260. The displaying unit 720 is configured to display 275, on a display of the mobile device 110, a notification 210 comprising the content 265 and a prompt 215 for the user to acknowledge the notification 210. The input receiving unit 725 is configured to receive input 295 from the user acknowledging the notification 210. The acknowledgment sending unit 730 is configured to send an acknowledgement message 300 to the remote server 120 in response to receiving the input 295.

Figure 8:
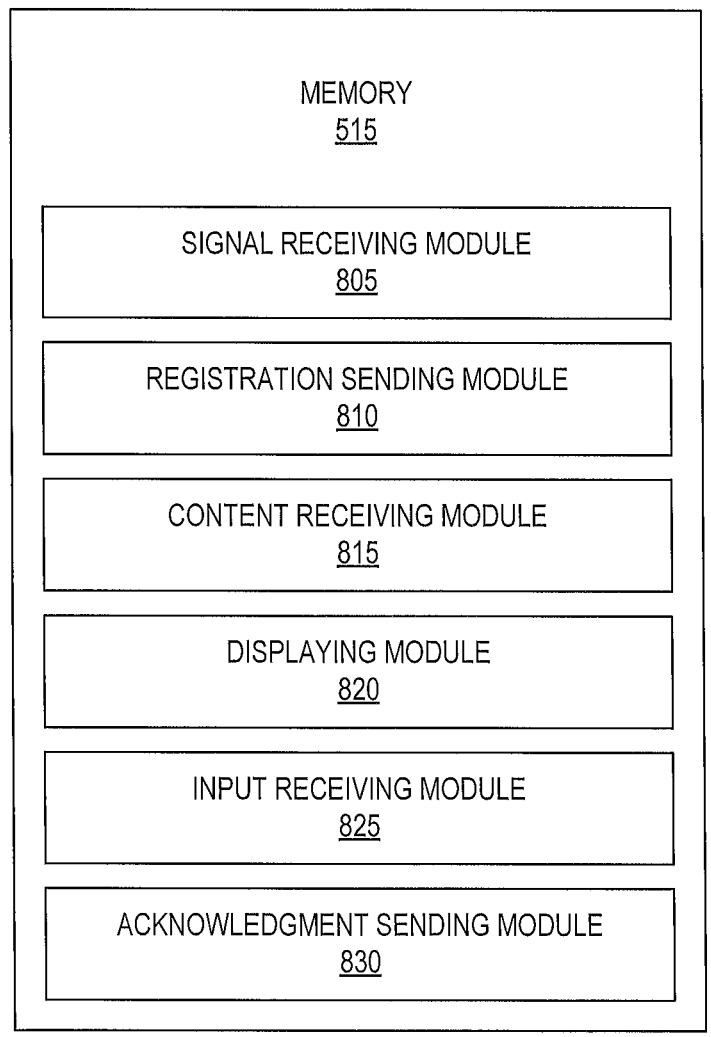
FIG. 8 is a logical block diagram that illustrates a memory containing software modules configured according to embodiments of the present disclosure.

FIG. 8 illustrates memory 510 comprising software modules for performing embodiments as discussed above. The memory 510 comprises a signal receiving module 805, a registration sending module 810, a content receiving module 815, a displaying module 820, an input receiving module 825, and an acknowledgement receiving module 830.

The signal receiving module 805 is configured to receive, via a radio interface of the mobile device 110, a signal 220 from an electronic source 105 within range 125 of the radio interface, the signal 220 originating from the electronic source 105 and comprising an address 225 of a remote server 120 that is distinct from the electronic source 105, and an identifier 230 of the electronic source 105. The registration sending module 810 is configured to send a registration 260 to the remote server 120 at the address 225, the registration 260 comprising an identifier 240 of the mobile device 110 and the identifier 230 of the electronic source 105. The content receiving module 815 is configured to receive content 265 associated with the electronic source 105 from the remote server 120 in response to the registration 260. The displaying module 820 is configured to display 275, on a display of the mobile device 110, a notification 210 comprising the content 265 and a prompt 215 for the user to acknowledge the notification 210. The input receiving module 825 is configured to receive input 295 from the user acknowledging the notification 210. The acknowledgment sending module 830 is configured to send an acknowledgement message 300 to the remote server 120 in response to receiving the input 295.

Those skilled in the art will appreciate that the various methods and processes described herein may be implemented using various hardware configurations that generally, but not necessarily, include the use of one or more microprocessors, microcontrollers, digital signal processors, or the like, coupled to, or comprising, memory storing software instructions or data for carrying out the techniques described herein.

The present invention may be carried out in other ways than those specifically set forth herein without departing from the essential characteristics of the invention. The present embodiments are to be considered in all respects as illustrative and not restrictive, and all changes coming within the meaning and equivalency range of the appended claims are intended to be embraced therein.

What is claimed is:

1. A method, implemented by a mobile device, the method comprising:
 receiving, via a radio interface of the mobile device, a signal from an electronic source within range of the radio interface, the signal originating from the electronic source and comprising:
  an address of a remote server that is distinct from the electronic source;
  an identifier of the electronic source;
 sending a registration to the remote server at the address, the registration comprising an identifier of the mobile device and the identifier of the electronic source;
 receiving content associated with the electronic source from the remote server in response to the registration;
 displaying, on a display of the mobile device, a notification comprising the content and a prompt for the user to acknowledge the notification;
 receiving input from the user acknowledging the notification;
 sending an acknowledgement message to the remote server in response to receiving the input.

2. The method of claim 1, wherein sending the registration is based on a comparison between information in the signal and a registration policy.

3. The method of claim 1, further comprising:
 receiving a notification policy from the remote server in response to the registration, the notification policy defining at least one behavior for the mobile device when displaying the notification;
 wherein displaying the notification on the display of the mobile device comprises displaying the notification according to the notification policy.

4. The method of claim 1, further comprising impairing usability of the mobile device until the input from the user acknowledging the notification is received.

5. The method of claim 1, further comprising periodically alerting the user until the input from the user acknowledging the notification is received, the alerting comprising at least one of outputting audio and vibrating the mobile device.

6. The method of claim 1, further comprising, before sending the acknowledgement message, failing to detect that the electronic source is in range and alerting the user in response, the alerting comprising at least one of outputting audio and vibrating the mobile device.

7. The method of claim 1, further comprising:
 disabling the sending of the acknowledgement message in response to failing to detect that the electronic source is in range of the radio interface;
 enabling the sending of the acknowledgement message in response to detecting that the electronic source is in range of the radio interface.

8. The method of claim 1, further comprising, receiving a reward notice from the remote server in response to sending the acknowledgement message.

9. A mobile device comprising:
 display circuitry configured to present visual information to a user;
 input circuitry configured accept input signals from a user;
 radio circuitry configured to:
  receive a radio signal from an electronic source;
  exchange data with a remote server that is distinct from the electronic source via a communications network;
 processing circuitry communicatively coupled to the display circuitry, input circuitry, and radio circuitry, and configured to:
  receive the signal from the electronic source within range of, and via, the radio circuitry, the signal originating from the electronic source and comprising:
   an address of the remote server;
   an identifier of the electronic source;
  send a registration to the remote server at the address via the radio circuitry, the registration comprising an identifier of the mobile device and the identifier of the electronic source;
  receive content associated with the electronic source from the remote server in response to the registration via the radio circuitry;
  display, via the display circuitry, a notification comprising the content and a prompt for the user to acknowledge the notification via the input circuitry;
  receive input, via the input circuitry, from the user acknowledging the notification;

send an acknowledgement message to the remote server, via the radio circuitry, in response to receiving the input via the input circuitry.

10. The mobile device of claim 9, further comprising a memory communicatively coupled to the processing circuitry and configured to store a registration policy, wherein the processing circuitry is configured to send the registration based on a comparison between information in the signal and the registration policy.

11. The mobile device of claim 9:
wherein the processing circuitry is further configured to receive a notification policy from the remote server via the radio circuitry in response to the registration, the notification policy defining at least one behavior for the mobile device when displaying the notification;
wherein to display the notification via the display circuitry, the processing circuitry is configured to display the notification according to the notification policy.

12. The mobile device of claim 9, wherein the processing circuitry is further configured to impair usability of the mobile device until the input from the user acknowledging the notification is received.

13. The mobile device of claim 9:
further comprising alerting circuitry communicatively coupled to the processing circuitry, the alerting circuitry comprising one or more of:
audio circuitry configured to output audio;
vibration circuitry configured to vibrate the device;
wherein the processing circuitry is further configured to periodically alert the user via the alerting circuitry until the input from the user acknowledging the notification is received.

14. The mobile device of claim 9:
further comprising alerting circuitry communicatively coupled to the processing circuitry, the alerting circuitry comprising one or more of:
audio circuitry configured to output audio;
vibration circuitry configured to vibrate the device;
wherein the processing circuitry is further configured to alert the user via the alerting circuitry before sending the acknowledgement message in response to the processing circuitry failing to detect that the electronic source is in range via the radio circuitry.

15. The mobile device of claim 9, wherein the processing circuitry is further configured to:
disable the sending of the acknowledgement message in response to failing to detect that the electronic source is in range via the radio circuitry;
enable the sending of the acknowledgement message in response to detecting that the electronic source is in range via the radio circuitry.

16. The mobile device of claim 9, wherein the processing circuitry is further configured to receive a reward notice via the radio circuitry from the remote server in response to sending the acknowledgement message.

17. A computer program product stored in a non-transitory computer readable medium for controlling a programmable mobile device, the computer program product comprising software instructions that, when run on the programmable mobile device, cause the programmable mobile device to:
receive, via a radio interface of the programmable mobile device, a signal from an electronic source within range of the radio interface, the signal originating from the electronic source and comprising:
an address of a remote server that is distinct from the electronic source;
an identifier of the electronic source;
send a registration to the remote server at the address, the registration comprising an identifier of the programmable mobile device and the identifier of the electronic source;
receive content associated with the electronic source from the remote server in response to the registration;
display, on a display of the programmable mobile device, a notification comprising the content and a prompt for the user to acknowledge the notification;
receive input from the user acknowledging the notification;
send an acknowledgement message to the remote server in response to receiving the input.

\* \* \* \* \*